United States Patent [19]

Wolfe

[11] Patent Number: 4,953,089
[45] Date of Patent: Aug. 28, 1990

[54] HYBRID ANALOG DIGITAL CONTROL METHOD AND APPARATUS FOR ESTIMATION OF ABSOLUTE VELOCITY IN ACTIVE SUSPENSION SYSTEMS

[75] Inventor: Paul T. Wolfe, Apex, N.C.

[73] Assignee: Lord Corporation, Erie, Pa.

[21] Appl. No.: 192,067

[22] Filed: May 9, 1988

[51] Int. Cl.[5] ............................................. G06F 15/20
[52] U.S. Cl. ................................ 364/424.05; 188/299; 280/707
[58] Field of Search .................. 73/660; 188/280, 299; 248/550, 562; 280/707; 364/424.05, 550

[56] References Cited

U.S. PATENT DOCUMENTS

| | | | |
|---|---|---|---|
| 3,807,678 | 4/1974 | Karnopp et al. | 248/562 |
| 4,065,154 | 12/1977 | Glaze | 280/707 |
| 4,215,403 | 7/1980 | Pollard et al. | 364/424 |
| 4,373,744 | 2/1983 | Glaze | 280/707 |
| 4,422,322 | 12/1983 | Spangler | 73/105 |
| 4,468,050 | 8/1984 | Woods et al. | 280/707 |
| 4,468,739 | 8/1984 | Woods et al. | 188/299 X |
| 4,491,207 | 1/1985 | Boonchanta et al. | 188/299 X |
| 4,567,564 | 1/1986 | Bittner et al. | 364/434 |
| 4,579,366 | 4/1986 | Doi et al. | 280/707 |
| 4,660,686 | 4/1987 | Münning et al. | 188/280 |
| 4,749,210 | 6/1988 | Sugasawa | 280/707 |
| 4,757,980 | 7/1988 | Schubert | 248/638 X |
| 4,827,416 | 5/1989 | Kawagoe et al. | 280/707 X |

Primary Examiner—Parshotam S. Lall
Assistant Examiner—Edward R. Cosimano
Attorney, Agent, or Firm—David L. McCombs; James W. Wright

[57] ABSTRACT

An improved method and apparatus is provided for estimation of absolute velocity in active or semi-active suspension systems. A controller produces a signal estimate of absolute velocity which can be implemented by a control algorithm to attenuate motion between spaced members, such as in vehicular suspension systems. The controller performs time integration of an accelerometer input signal by an analog integrator means comprising a first-order low-pass filter. A digital feedback or offset means is utilized to stabilize the signal and constrain the constant and relatively low frequency components of the analog integrated signal about an oscillatory voltage range. A digital filter means receives the stable signal and removes selected constant and low frequency components of the signal to produce a signal indicative of absolute velocities for a frequency range of interest further stabilized about a select mid-range voltage value.

14 Claims, 5 Drawing Sheets

HYBRID ANALOG DIGITAL CONTROL METHOD AND APPARATUS FOR ESTIMATION OF ABSOLUTE VELOCITY IN ACTIVE SUSPENSION SYSTEMS

BACKGROUND OF THE INVENTION

The invention relates generally to electronic control systems for processing signals indicative of a motion condition and more particularly provides a hybrid analog digital controller for receiving an accelerometer input signal and producing an output signal indicative of absolute velocity. Specifically, the controller includes an analog integrator, digital feedback stabilizer and digital filter.

Active suspension systems accomplish motion attenuation by continuously controlling a suspension force independently of the relative movement of the suspension in real-time response to a command signal. Active systems are particularly useful when configured for control of motion between relatively moveable members such as in vehicular suspensions. Due to the relatively large power requirements typically required for generating appropriate suspension forces, systems of the so-called semi-active type have been proposed as exemplified in U.S. Pat. Nos. 3,807,678; 4,660,686; 4,468,050; and 4,468,739. The semi-active damper concept differs from fully active systems in that it does not employ an active actuator means, hydraulic pump or similar external source of high-pressure fluid to provide the damping force. It is the resistance to fluid flow within the system that generates the damper force. Thus, when the absolute velocity of the mass to be isolated is in a direction opposite to the relative motion between the mass and its support, the damper will not be able to provide a force in a direction to counteract the movement of the mass. In these instances, a zero or nonresistant force is produced by the system. The result is a most effective and energy efficient method of enhanced vibration control closely approximating the performance of fully active damping mechanisms.

Implementation of active suspension systems in, for example, vehicle suspension applications and for other complicated, high-order nonlinear systems having multiple degrees of freedom and a plurality of dampers requires system response to a variety of forces which may not be easily modulated or controlled. Input disturbances such as those caused by road surface irregularities, and inertial forces commonly associated with vehicle motion, must be continuously monitored for proper generation of counteracting suspension forces. An active damper ideally should generate compensating forces of appreciable magnitude only at times when the effect would be to attenuate the vibratory motion of the member that is to be isolated. Successful damper performance for any system is, therefore, greatly dependent upon the particular control algorithm employed to vary the damper forces. While an ideal result cannot be completely realized in practice, active suspension systems of the semi-active type can approach a high degree of vibration attenuation or isolation when the damper is operated in accordance with an appropriate control algorithm such as, for example, that disclosed in U.S. Pat. No. 3,807,678 and U.S. Pat. No. 4,491,207. These control algorithms produce damper forces in real-time response to a motion condition experienced by the system based upon a determination of the instantaneous absolute velocity of the sprung mass and upon a determination of the instantaneous relative velocity between the sprung mass and supporting mass interconnected by the damper assembly.

Instantaneous and continuous measurements of absolute velocity, while a common input parameter required for implementation of control algorithms of the above type, are difficult in practice to obtain for moving suspension systems. In order to realize such control algorithms, it is necessary to determine the absolute velocity of a point on a rigid body; i.e., a sprung mass or the frame of a vehicle. This value must be determined without the benefit of fixed reference. One approach to solving this problem is to obtain an estimate of absolute velocity or signal indicative of absolute velocity by integrating an accelerometer signal. The electronic hardware implementation required for generating an estimated absolute velocity signal is somewhat problematic and the results achieved heretofore have been less than ideal.

Complex digital systems can be designed that provide an accurate device or controller for generating a signal indicative of absolute velocity. For example, digital system implementation may utilize optimal control theory under a sophisticated theoretical foundation such as Kalman filtering. However, the use of digital filter design contemplates the performance of relatively complicated calculations that require detailed and cost prohibitive components to carry out the necessary functions. Likewise, digital systems usually will require an anti-aliasing filter to avoid sampling errors in the system. An anti-aliasing filter serves to attenuate high-frequency signal components which might provide erroneous information of overall system input.

Ideally, a controller constructed of analog components to perform signal integration is preferable due to low cost and simplicity of construction. Analog components further eliminate the need for expensive anti-aliasing filters due to their continuous nature. An analog controller would reduce the overall complexity of the system. However, it has been found that analog components such as capacitors and resistors in conjunction with operational amplifiers do not perform well under the frequency parameters common to the implementation of control algorithms for active devices. The operative band width for the controller is approximately between 0.5 and 20 hertz. In addition, corrupting noise is present with significant energy as high as 60 hertz. An analog integrating circuit will likely experience D.C. bias and large or infinite D.C. gain which will saturate the system components. Likewise, unusually large capacitors and resistors must be employed to overcome component inaccuracies. Leakage, large physical volumes and increased expense diminish the practical effectiveness of analog controller devices.

It is accordingly an object of the present invention to provide a controller for producing an output signal indicative of absolute velocity which eliminates or substantially minimizes the above mentioned and other problems and limitations typically associated with both digital and analog devices.

SUMMARY OF THE INVENTION

The present invention provides an improved control method and apparatus for estimation of absolute velocity in active suspension systems using analog and digital electronic components. An analog filter device receives an input signal from an accelerometer and produces a time integrated signal. A digital feedback means is utilized to constrain the constant and relatively low frequency components of the time integrated signal about an oscillatory voltage range to produce a stable signal. A digital filter means then receives the stable signal and removes selected constant and low frequency components of the signal to produce an output signal indicative of absolute velocity within a frequency range of interest further stabilized about a selected mid-range voltage value.

Since the hybrid analog digital controller does not experience the inaccuracies normally associated with analog devices and avoids the complex arrangements normally required for the design of purely digital devices, a more reliable and economical control method and apparatus is provided for producing a signal output estimate of absolute velocity from an accelerometer signal. The hybrid analog digital controller device also overcomes the limitations associated with conventional controllers. The use of an analog integrator in combination with digital stabilizing and filtering means minimizes the computational problems common to analog components and permits that part of the signal modification which is inherently inaccurate for physical analog devices to be performed digitally. Anti-aliasing filter means normally required for digital sampling is provided inherently.

In a preferred embodiment of the invention, the hybrid analog digital controller is representatively used in conjunction with an active or semi-active vehicle suspension control algorithm for providing information required to attenuate motion between a mass and its support. Typical control algorithms often require information pertaining to the absolute velocity of the mass to be isolated for driving the variable damper to attenuate motion in the system. The absolute velocity must be determined without the benefit of a fixed inertial reference. An accelerometer signal indicative of the motion condition of the mass can be integrated and processed electronically to produce an estimate of absolute velocity for implementation by the control algorithm.

The controller of the present invention includes an analog integrator for integrating the input signal to the accelerometer and first order low pass filter for eliminating unwanted "noise." The analog integrator typically will have a pass band gain of approximately equal to 50 and break frequency in the range of 0.1 Hertz. The analog integrator may be constructed using analog components such as operational amplifiers, capacitors and resistors. Because the relatively low frequencies are passed by the analog integrator, the accelerometer signal would accumulate and drift at low frequencies resulting in saturation of the components and non-performance. The output of the analog integrator is, therefore, controlled digitally by a digital stabilizer. The digital stabilizer generates a feedback or offset signal to the analog integrator through a summing junction for effectively subtracting the low frequency errors and centering the analog integrator output signal roughly within the voltage operating range of the analog components. The low frequency signal which accumulate in the system and drive the output beyond the range in which useful information can be provided are thus removed by the offset signal to accomplish the desired stabilized integration response. Because the digital stabilizer does not function entirely to remove the low frequency components of the signal, which can fluctuate within an operational voltage level, a digital filter is provided to further stabilize the signal about the zero or mid-range voltage point. The digital filter locates the short-term frequency mean of the signal about a mid-point voltage value by further rejection of low frequency components.

The digital computations performed by digital stabilizer and digital filter are accomplished using a microcontroller to perform calculations based on a continuous sum of sampled signal input values. A number accumulator utilizing multiple 8-bit words stores a continuous sum of input sample values. The feedback signal is generated by performing shifting operations within the digital computer. The shifting operations performed by the digital stabilizer to produce the feedback signal result in an output signal which damps down slowly and oscillates somewhat. The shifting operations performed by the digital filter are over a lesser range and tend to attenuate the signal more quickly to locate the short-term mean of the relatively high frequency components about a selected voltage value.

BRIEF DESCRIPTION OF THE DRAWINGS

For a better understanding of the invention, reference may be made to the following description of exemplary embodiments, taken in conjunction with the figures of the accompanying drawings, in which.

DESCRIPTION OF THE PREFERRED EMBODIMENTS

Figure 1:
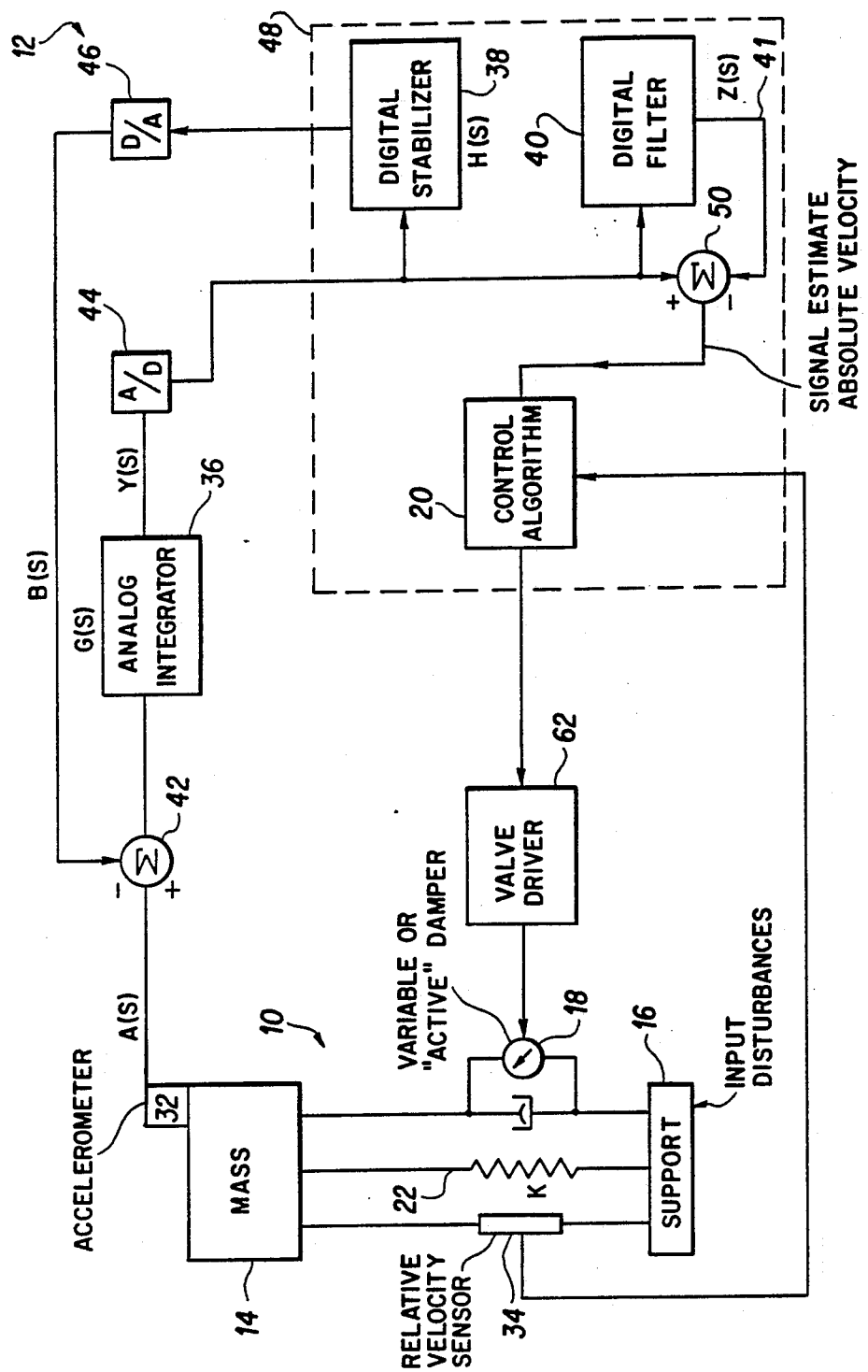
FIG. 1 is a block diagram representation of an exemplary motion attenuation system incorporating features of the present invention and showing controlled regulation of a damper force in which a signal indicative of the absolute velocity of the mass is produced from an accelerometer input signal and is used in conjunction with a relative velocity signal to implement a damper force control algorithm.

Referring now to the drawings, FIG. 1 illustrates an isolation system 10 and hybrid analog digital controller, generally indicated at 12, of the present invention. The isolation system 10 resiliently supports a mass 14 to be isolated relative to a support 16 in a manner to reduce the transmissibility of mechanical energy in the form of shock and vibration therebetween caused by input and inertial forces. Motion attenuation is accomplished by varying the force exerted by damper 18 implemented in accordance with control algorithm 20. The particular control algorithm utilized in system 10 is not deemed relevant for purposes of the present invention, other than to demonstrate a system 10 which employs a signal estimate of the absolute velocity of the mass to be isolated produced by the hybrid analog digital controller 12. Further, the isolation system will be described for operation with regard to a system having a single translation degree of freedom along a vertical axis; the invention can be equally well applied to systems having additional degrees of freedom and for applications other than suspension systems where it is desired to control the transmission of energy between spaced members in a manner dependent upon electronically modified signals indicative of the absolute velocity of the mass.

As discussed, known electronic controllers for receiving an input signal indicative of a motion condition and producing a consistent output signal estimate of absolute velocity have been difficult to design in an effective, cost efficient manner for commercial application. Purely digital systems are inherently complicated and can be expensive to implement. The digitization of input signals often results in sampling errors caused by unusual instantaneous signal values which may necessitate the need for anti-aliasing filters. Purely analog devices, on the other hand, in theory perform the signal modifications and handle system irregularities or noise in a superior manner to digital devices. However, real analog components deviate from ideal mathematical models at low frequencies normally associated with the design requirements for controllers of the present type. While the inherent errors in analog devices are normally neglected at high frequencies, at low frequencies leakage of unreasonably large resistors in conjunction with offset currents on amplifiers present problems which impact on system performance. Attempts to overcome these problems by designing analog devices with large value components or digital devices complex in nature have not been entirely satisfactory.

The hybrid analog digital controller of the present invention overcomes the limitations of known prior art controllers for producing a signal estimate of absolute velocity. For example, the use of an analog integrator in combination with digital stabilizing and filtering means eliminates a certain amount of computational throughput by the use of analog components and permits that part of the signal modification which is inherently inaccurate for physical analog devices to be performed digitally. The anti-aliasing filter required for digital sampling and digital filtering is provided inherently by the analog integrator.

Figure 2:
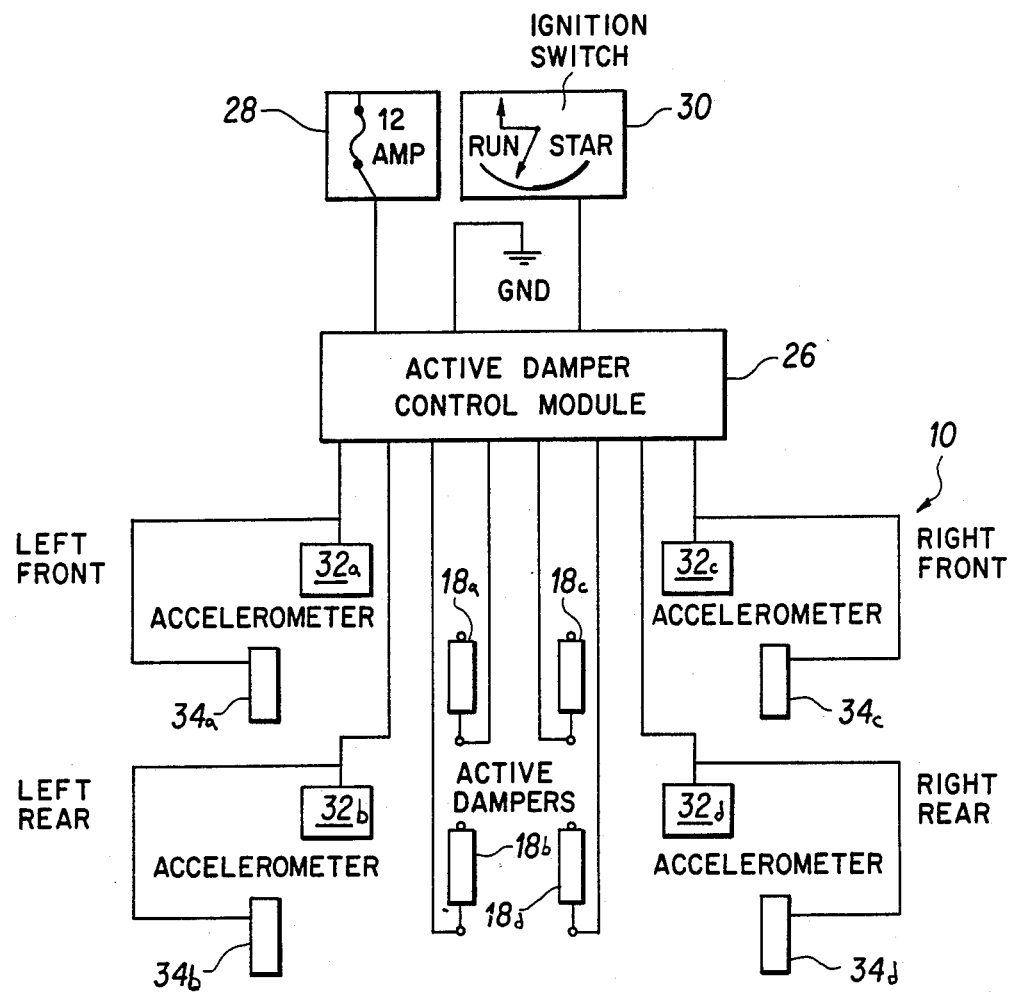
FIG. 2 is a block diagram representation of an exemplary motion attenuation system similar to that of FIG. 1 in which four independent motion attenuating dampers and motion condition sensor means are operable in conjunction with a control module incorporating features of the present invention.

Referring again to the drawings, and particularly to FIGS. 1 and 2, the isolation system 10 of the present invention comprises a passive isolator 22 and an active damper 18. The passive isolator 22 is coupled in load carrying or load transmitting relation between mass 14 and support 16 within allowable deflection limits and has a spring constant K. The spring constant K preferably will provide isolation for mass 14 in the operating or exciting frequency range of the system. By actively regulating the damping characteristics of the damper 18, it can generate controllable counteracting forces and cooperate with the passive isolator 22 to effectively regulate the transmissibility characteristics of the isolation system 10. The manner of control and design of active damper 18 is not deemed relevant for purposes of the present invention and depends on the desired effect on transmissibility and inherent performance characteristics of the damper. Because the hybrid analog digital controller 12 of the present invention functions to receive input information indicative of the motion condition of the mass and modify that signal to produce a signal estimate of absolute velocity necessary to effectuate control of the variable damper force, the isolation system 10 disclosed herein will be described with reference to a control algorithm requiring a signal proportional in magnitude and sign to the absolute velocity of mass 14. The principles of the present invention may, of course, be employed for a variety of applications.

Specifically, the control algorithm used as a representative example in isolation system 10 requires a signal proportional in magnitude and sign to the absolute velocity of mass 14 and a signal proportional in magnitude and sign to the relative velocity between mass 14 and to support 16. If the product of the absolute velocity X of mass 14 and the relative velocity Y between mass 14 and support 16 is greater than or equal to zero, the variable force damper will be in the "on" state. If the product of the absolute velocity X of mass 14 and the relative velocity Y between mass 14 and support 16 is negative, the variable damper will be in the "off" state as shown below in Equations 1 and 2:

If: $\dot{X} \cdot Y \geq 0$, then "on";     (1)

If: $\dot{X} \cdot Y < 0$, then "off".     (2)

The implementation of this particular control algorithm assumes a semi-active damping device, in which there is no actual force generated by external hydraulic or servo means at times when the relative movement between the mass 14 and support 16 would tend to amplify rather than attenuate the vibratory motion of the mass 14. The "on" and "off" damper states may contemplate relatively on and relatively off positions. Damper 18 is externally controllable under the control algorithm, preferably independent of the motions seen by the damper, for actively regulating the damping characteristics as desired. While many other control algorithms may be contemplated for attenuation of motion between spaced members, the control algorithm described herein adequately demonstrates the incorporation of the present invention to solve a particular isolation problem.

As shown in FIG. 2, the hybrid analog digital controller 12 of the present invention may be employed in conjunction with the components of isolation system 10 to a variety of applications, including a four-wheel vehicle suspension. Four active dampers 18a-18d may be controlled by the system 10, each having associated therewith appropriate motion condition sensors, to be discussed. The control module 26 incorporates the functioning components to drive the active dampers and includes controller 12 and control algorithm 20. A power supply 28 is shown to activate the electronic components of system 10. In a vehicle application, control module 26 may be activated by an ignition switch 30. Alternative variations for single and multiple damper applications are contemplated.

For isolation systems which move relative to the surface of the earth, producing a signal proportional in magnitude and sign to the absolute velocity of the moving mass is problematic; measurements cannot be made relative to a fixed reference. In order to provide the necessary input information for the particular control algorithm to implement the desired damper state, an accelerometer 32 provides a sensor input signal. The accelerometer 32 is mounted on the isolated mass 14 and continuously generates a signal proportional to the acceleration of mass 14. As will be discussed, the hybrid analog digital controller 12 of the present invention modifies the input signal received from accelerometer 32 in a manner subsequently described to produce a signal output proportional in magnitude and signed to the absolute velocity of mass 14. As shown in FIG. 2, four accelerometers 32a-32d are associated with each of the corresponding dampers 18a-18d. The continuously generated output signal is utilized by the control algorithm 20 to drive the variable active damper 18a-18d. For the isolation system 10 herein, as shown in FIGS. 1 and 2, accelerometers 32a-32d are mounted in multiple locations according to the number of active dampers 18a-18d employed. While the hybrid analog analog digital controller 12 is described herein by example to a limited number or a single mass 14, numerous accelerometer signals may be processed through control module 26 employing the controller 12 of the present invention to implement control algorithm functions to individual active dampers according to the specific motion condition to be attenuated. Accelerometers 32a-32d, as mentioned, continuously measures and generates a signal indicative of the absolute acceleration of mass 14. The acceleration as seen by accelerometers 32a-32d is vertical acceleration. Therefore, variations in orientation of mass 14 caused, for example, by movement of a vehicle body may introduce inaccuracies into the system. As will be apparent, the controller 12 produces an output signal estimate of absolute velocity within acceptable limits and reasonably compensates for such variations.

A relative velocity sensor 34 is also shown herein to produce a signal indicative of the relative movement between mass 14 and support 16. As shown in FIG. 2, four relative velocity sensors 34a-34d are associated with each of the corresponding dampers 18a-18d. In connection with the control algorithm 20 utilized by example herein, a continuously generated signal proportional to the relative velocity between mass 14 and support 16 is required to implement the control of variable active dampers 18a-18d. The motion condition parameters required for implementation of any variety of control algorithms may vary, and include input information concerning relative displacement, in addition to the parameters discussed.

The hybrid analog digital controller 12 of the present invention is comprised of an analog integrator 36, digital stabilizer 38 and digital filter 40. Input signals from the one or more accelerometers 32 are summed by summing junction 42 for input to integrator 36. The low frequency component of the analog integrator signal is attenuated by feedback of a digital signal from digital stabilizer 38 and maintained within a controlled voltage range. In order to generate a meaningful signal proportional both in magnitude and sign to the absolute velocity of the mass, digital filter 40 adjusts the short-term frequency mean about the zero or a mid-range voltage level.

In order to continuously generate a signal proportional to the vertical velocity of mass 14 from the absolute acceleration signal of accelerometer 32, it is necessary for the controller 12 to perform a mathematical integration of the input signal. Problems associated with a perfect integrator exist for generating a meaningful signal over time and under the varied conditions of performance which may be encountered by isolation system 10. For example, the input signal to the analog integrator must be within the performance band width of the physical electronic components for a proper integration to occur. Very low frequency input signals such as those generated by changing system elevation and orientation changes have a tendency, when integrated, to create large signals at frequencies near D.C. and thus saturate the components. Low frequency deviations which may cause the system to drift outside the operating range can be caused by conditions such as temperature drift of the sensors or changes in vertical orientation. Solutions to problems of a perfect integrator include higher order approximations represented by, for example, the transfer functions subsequently described.

Figure 4:
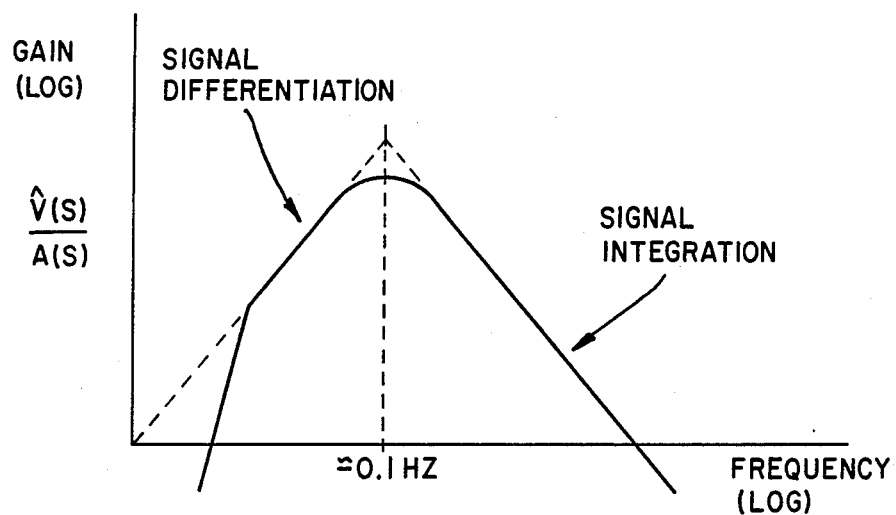
FIG. 4 is a graphical representation of the relationship between gain and frequency of a signal $\hat{V}(s)/A(s)$ produced by the controller and depicts the rejection of low-frequency signal components below the break frequency of approximately 0.1 hertz by signal differentiation and the signal estimate of absolute velocity produced by signal integration in the system operating range above the break frequency.

The hardware implementation of the hybrid analog digital controller 12 of the present invention for application to a system such as isolation system 10 preferably seeks to achieve a signal filter similar to that described graphically in FIG. 4. The half-power or break frequency is approximately 0.1 Hertz, although this representative parameter may, of course, vary for differing system applications. The filter performs as an integrator above the break frequency to produce an integrated signal estimate of the absolute velocity of mass 14. Below the break frequency, the filter performs as a differentiator to reject constant and low frequency components which would cause the system to drift.

According to the particular design preference, the signal may be characterized on the differentiation side by second order, as well as first order roll-off to D.C. As will be shown, the signal filter to generate the estimate of absolute velocity as described is uniquely accomplished using both analog and digital components.

Figure 3:
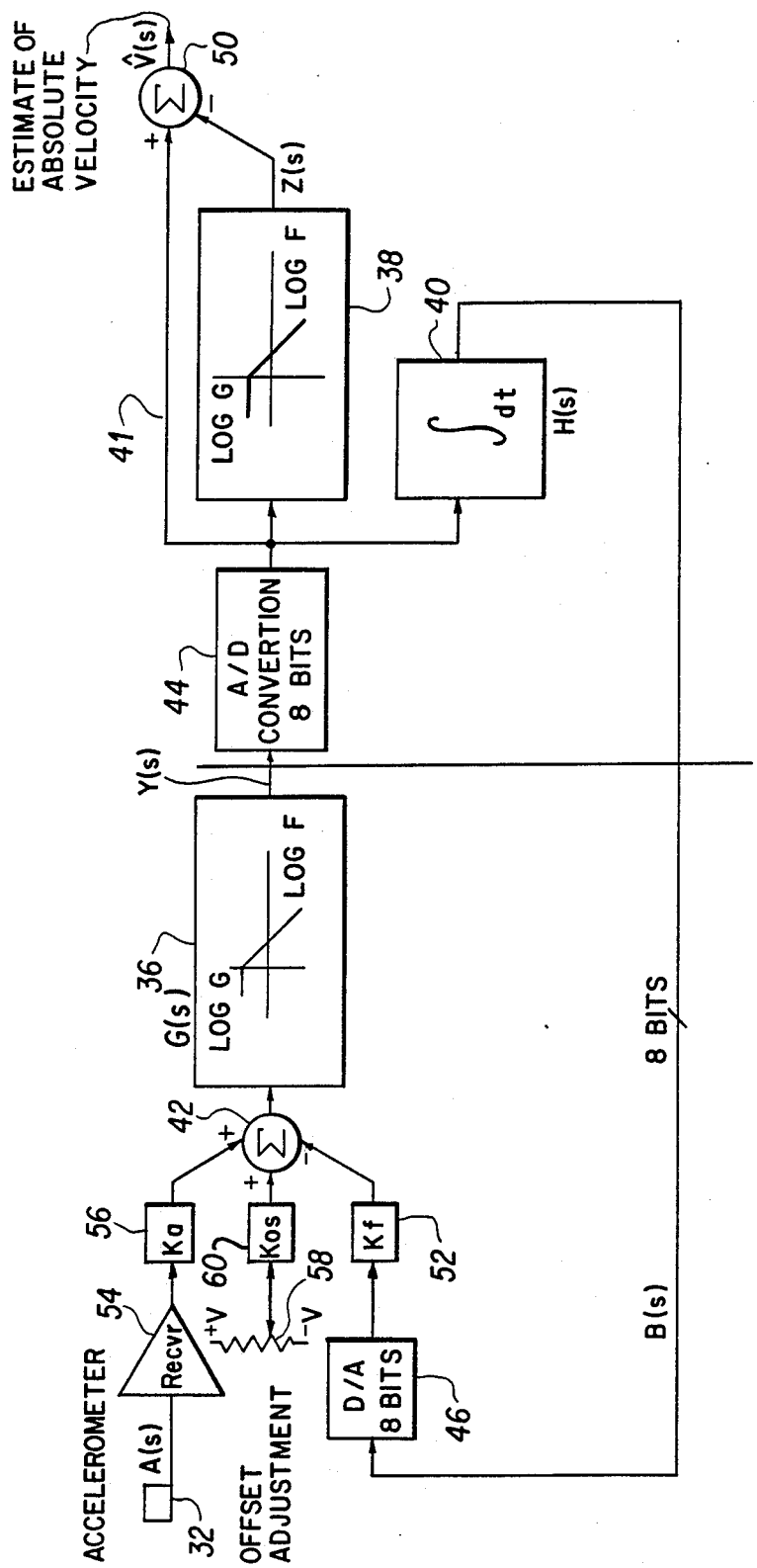
FIG. 3 is a partially schematic and partially block diagram representation of the hybrid analog digital controller of the present invention for producing a signal estimate of absolute velocity from an accelerometer input.

The analog components of the hybrid analog digital controller 12 include analog integrator 36 for integrating the input signal from the accelerometer 32. As depicted in FIG. 3, the analog integrator has a first order low-pass filter for eliminating noise and the passband gain is approximately equal to 50. For relatively higher frequencies, a slope of −20 dB per decade and 90 degree phase lag is apparent for performing the signal integration. The analog integrator 36 may be constructed using analog components such as operational amplifiers, capacitors and resistors. Naturally, because the relatively low frequencies are passed by the analog integrator 36, the accelerometer signal would accumulate and drift at low frequencies resulting in saturation of the components and non-performance. Low frequencies below 0.1 hertz can occur for several reasons, as described; drift caused by temperature changes in the system components, leaning of the accelerometer, and changing elevation of the vehicle.

The output signal of analog integrator 36 is controlled digitally by digital stabilizer 38. Digital stabilizer 38 generates a feedback or offset signal to analog integrator 36 through summing junction 42 for effectively subtracting the low frequency errors and centering the analog integrator output signal roughly within the voltage operating range of the analog components. The output from analog integrator 38 must be digitized by an analog to digital convertor 44 for entry into the digital domain. Likewise, the signal produced by digital stabilizer 38 must be converted to linear form by digital-to-analog convertor 46 in order to once again be accommodated by analog integrator 36. As represented by the bordered area 48 in FIG. 1, the digital functions of the hybrid analog digital controller 12 including the functions of the digital stabilizer 38, digital filter 40 and control algorithm 20 may be performed by a single microcontroller. A single-chip microcomputer having highly sophisticated on-chip peripheral functions such as the HCMOS MC68HC11 microcomputer manufactured by Motorola is a device well suited to accomplish enumerated digital functions. A device of this nature likewise has the ability to perform analog-to-digital conversions within the device. A variety of digital devices may alternatively be contemplated to handle the desired functions.

Figure 5:
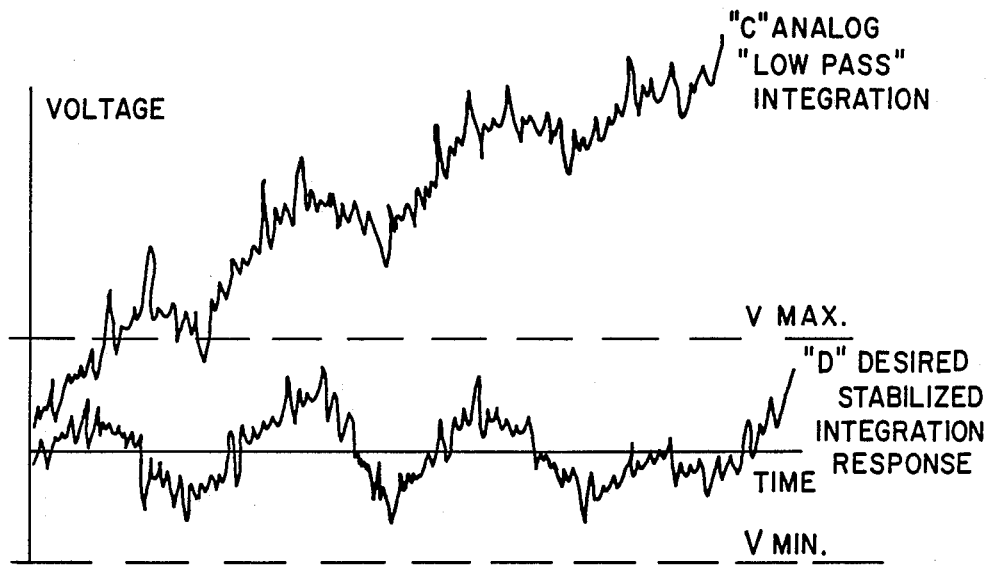
FIG. 5 is a graphical representation of the relationship between signal voltage and time for an integration low-pass filter without stabilization represented by C showing signal drift, and a stabilized integration response represented by D showing a signal operating within the performance voltage range $V_{max}$ to $V_{min}$ of the system.

The signal output of analog integrator 36 is efficiently constrained by digital stabilizer 38 as shown in FIG. 5. The time history plots shown in FIG. 5 graphically illustrate the manner in which the output from analog integrator 36 represented by C will drift beyond the voltage performance range and saturate the analog components. The low frequency signals which accumulate in the system and drive the output beyond the range in which useful information can be provided are removed by the offset signal provided by digital stabilizer 38 to accomplish the desired stabilized integration response signal as shown by D. The feedback signal generated by digital stabilizer 38 is subtracted, or inverted and summed, with summing junction 42 to remove or subtract constant and low frequency components from the signal. The digital stabilizer 38 does not function to entirely remove the low frequency components of the signal, but drives down the low frequency signal components to constrain the signal, which can fluctuate over time within an operational voltage level, preferably roughly about the zero voltage point. If the specific control algorithm requires information indicative of when the absolute velocity zero crossings occur, so as to provide a signal proportional in magnitude as well as in sign to the absolute velocity of the mass, a signal such as D fluctuating because of large low frequency gain and riding on low frequency components will not provide the required information as to the sign of the absolute velocity. This is exemplified in FIG. 7A by points $P_1$ and $P_2$. The signal fluctuating or riding on a low frequency or D.C. component does not indicate zero crossings at the frequencies of interest, and correct switching or implementation of the control algorithm 20 will not occur. It is, therefore, the function of digital filter 40 of the present invention to further stabilize the signal produced by analog integrator 36 and digital stabilizer 38 shown by D in FIG. 5 about the zero or mid-range voltage point. In other words, the digital filter 40 locates the short-term frequency mean of the signal D about a zero voltage value by rejecting the low frequency components as is depicted in FIG. 7C. Depending upon the particular frequencies of interest for the system and other design parameters which may be selected or varied for the particular application, it should be noted that a working controller 12 could be constructed which omits digital filter 40.

Analytical expressions for the transfer functions of analog integrator 36, digital stabilizer 38 and digital filter 40 are also useful in understanding the manner in which the signal estimate indicative of the absolute velocity of mass 14 is generated by hybrid analog digital controller 12. For purposes of clarity, functional placement of mathematical notations are included in FIGS. 1 and 3 for the expressions described below. The forward path or analog integrator 36 consists of a first-order low-pass filter that can be described by the transfer function:

$$G(s) = \frac{K_0}{1 + T_o S} \quad (3)$$

where $K_0$ represents a gain value, $T_o$ is a time constant and S is the complex frequency variable. The feedback is performed by digital stabilizer 38 and may be represented by the transfer function:

$$H(s) = \frac{K_3}{K_4 + S} \quad (4)$$

where K3 and K4 are selected constant values. If the digital stabilizer 38 operates as a pure integrator, K4 equals 0. Application of the negative feedback loop solution for the transfer function at point Y(s), FIGS. 1 and 3, shows:

$$\frac{Y(s)}{A(s)} = \frac{SK_0/T_0 + K_4K_0/T_0}{S^2 + S(1/T_0 + K_4) + K_0K_3/T_0} \quad (5)$$

The result of this equation is that at high frequencies the system performs as an integrator, and rejects low frequencies. If K4 equals zero, the overall result is rejection of D.C. If K4 does not equal zero, the result is at least a reduction in the gain of the system. The feedback or offset signal produced by digital stabilizer 38 is discrete and the finest increment of change through the digital feedback may represent several counts of change through the analog integrator 36 as seen by the A/D converter resulting in a "chopping" effect or limit cycle. The system has not completely removed all of the low frequency deviations, but merely centered the signal about a specific operating voltage.

The digital filter 40 modifies the signal received from digital stabilizer 38 in a manner to produce the output signal proportional in magnitude and sign to the absolute velocity of mass 14. The digital filter 40 is a digital low-pass filter with unity passband gain which is subtracted from the feed forward of the signal from digital stabilizer 38 at numerical summing junction 50 which performs this function. The resulting filter and subtraction may, for examples, be represented by the transfer function:

$$\frac{\hat{V}(s)}{Y(s)} = 1 - \frac{1}{1 + T_2 S} = \frac{T_2 S}{1 + T_2 S} \qquad (6)$$

where $T_2$ is a time constant and S is the complet frequency variable. The overally result of digital filter 40 is effectively a high-pass filter which centers the output signal from the digital stabilizer 38 about the zero voltage point. the low-pass filter signal of digital filter 40 produces negligible output at or above the half power frequency and unity gain at constant and relatively low frequencies for summation with the feed forward signal. Cascading the transfer functions Y(s)/A(s) to $\hat{V}$(s)/Y (s) gives the overall transfer function for the controller 12:

$$\frac{\hat{V}(s)}{A(s)} = \frac{S_2 K_0/T_0 + S K_4 K_0/T_0}{S^3 + S^2[1/T_2 + 1/T_0 + K_4] + S[1/(T_0 T_2) + K_4/T_2 + K_0 K_3/T_0 + K_0 K_3/(T_0 T_3)]} \qquad (7)$$

The result, if a pure integral feedback is provided such that K4=2, is a faster, second-order roll-off at low frequencies to D.C. without seriously interfering with the integration characteristics within the operating bandwidth.

From the above, it is apparent that the various system constants may be selected to produce a controller operative under a variety of specific system parameters. The above described transfer functions need not be interpreted in a limiting sense and serve to exemplify to those skilled in the art representative operations which may be performed by the hybrid analog digital controller 12.

The functions performed digitally by the digital stabilizer 38 and digital filter 40 involve microcontroller computations based on a continuous sum of sampled signal input values computed over a continuous signal sampling duration. In the digital stabilizer 38, a number accumulator utilizing multiple 8-bit words stores a continuous sum of input sample values from analog integrator 36. The 8-bit word size is representative only, and it is contemplated that other word sizes may be used as desired. The continuous sum stored within the digital accumulator can be described for any sampling value n by the function:

$$f(n) = f(n-1) + r(n) \qquad (8)$$

where f(n−1) is the previous accumulator sum and r(n) is the next sample signal value. therefore, the sum is continuously generated within the accumulator over time and old information is never disgorged. The feedback operation prevents the sum from growing without bound. As the sum becomes larger in the accumulator, the feedback offset is proportionally greater, in turn causing the analog output to eventually track in the opposite direction according to the sampling rate of the computer. The accumulator computation of a continuous sum over time is superior to that of running average calculations in which signal output over a relatively large sampling range is computed. A running average calculation requires a large amount of CPU memory to store the numbers generated and perform the numerical computations. Since hardware applications are constrained by the size of the CPU and the amount of memory space available, it is desirable to perform the necessary calculations in the most economical fashion. The divisions necessary to perform the integration and generate the feedback or offset signal to analog integrator 36 are performed by shifting operations within the digital computer. A shift of $N_1$ positions results in a division by 2 to the power of $N_1$. Thus, the divisions performed by the digital register for register with the input being increments of 8-bit numbers. The output of the integrator for division is this performed by a $N_1$ bit shift to result in a division by 2 exp. $N_1$. For example, a 13-bit shift may be used resulting in a division by 8192. The feedback signal must, therefore, persist for some time to reduce the amplitude of the integrator output. Because of the time delays, the output signal will oscillate and damp down fairly slowly. The number $N_1$ of bit shifts may vary according to the desired system requirements.

All of the parameters above may be varied in accordance with design preference and yet operate in a manner to provide an appropriate offset value to analog integrator 36 in order to constrain the constant and low frequency components of the signal within a preferred operating voltage range.

The digital filter 40, as will be described, further stabilizes the signal about an exact or mid-range voltage value. The digital filter 40 received the stabilized signal from the analog integrator 38 subsequent to performance of the digital filtering function. Filter 40 operates essentially as a high-pass filter to eliminate excess low frequency components of the stabilized signal to locate the short-term mean of the relatively high frequency components about a selected voltage value. If the selected voltage value is zero, the result is an output signal proportional in magnitude and sign to the absolute velocity of mass 14. The digital accumulator of the microcontroller for digital filter 40 is functionally similar to that of the digital stabilizer 38 as described above, in that shifting operations are performed on a continuously generated sample signal sum. That is, division of the signal sum is accomplished by $N_2$ bit shifts to generate the filter output. Because digital filter 40 generally tracks faster than the stabilizer 38, $N_2$ is less than the previously described value $N_1$ for producing the offset. Also, the continuous sample sum is computed differently to provide a unit gain subtraction from the feed forward signal. The division performed by bit shifting of the continuous sum in the accumulator of digital filter 40 is equivalent to a shorter term $N_2$. The continuous sum generated by the microcontroller accumulator can be described for a particular sample value n by the equation:

$$F(n) = F(n-1) - (1/N_2) \cdot f(n-1) + r(n) \qquad (9)$$

where $f(n-1)$ is the previous continuous sum value, $r(n)$ is the next sampling value, and $(1/N_2) \cdot f(n-1)$ is equal to the previous average value. Subtraction of this previous average value takes advantage of how the sample sum $f(n)$ would be decremented over time, over a large number of original sample values; the result is an accurate offset value which permits the system to operate about the zero voltage point. The average value is computed by $N_2$ bit shifts. This accomplishes a division in a manner similar to the division necessary to produce the filter output for summation to the feed forward of the stabilized signal, and produce the output estimate of absolute velocity. The result is removal of the effects of the limit cycle generated by analog integrator 36 subsequent to stabilization of the signal by digital stabilizer 38 caused by realtively slow response and finite resolution. The digital stabilizer 40 causes removal of the low frequency components and D.C. roll-off to permit stabilization of the signal about the zero voltage level.

Figure 6A:
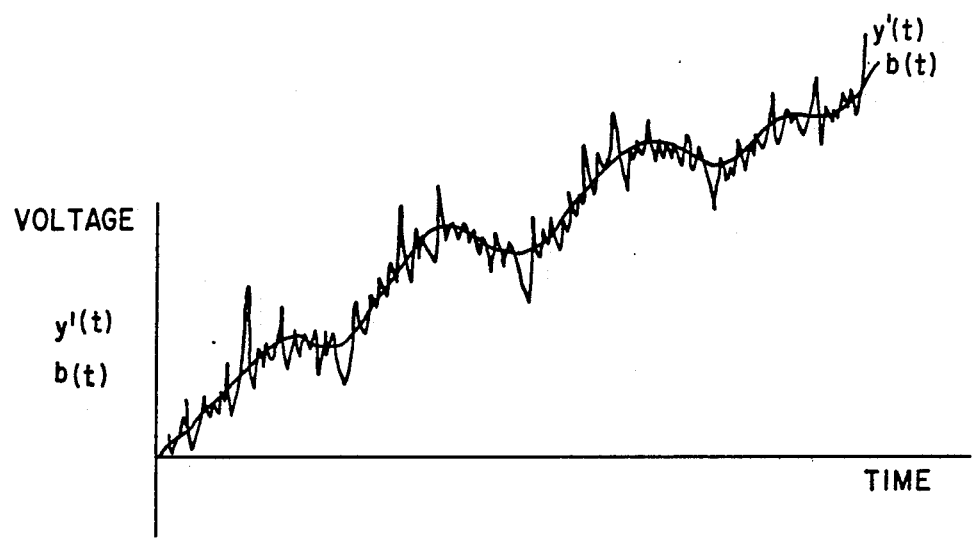
FIG. 6A is a graphical representation of the relationship between signal voltage and time for signal y'(t) (signal C of FIG. 5) and signal b(t) and shows the attenuation of the high frequency components by the digital stabilizer to produce a filtered signal b'(t) indicative generally of y(t)
Figure 6B:
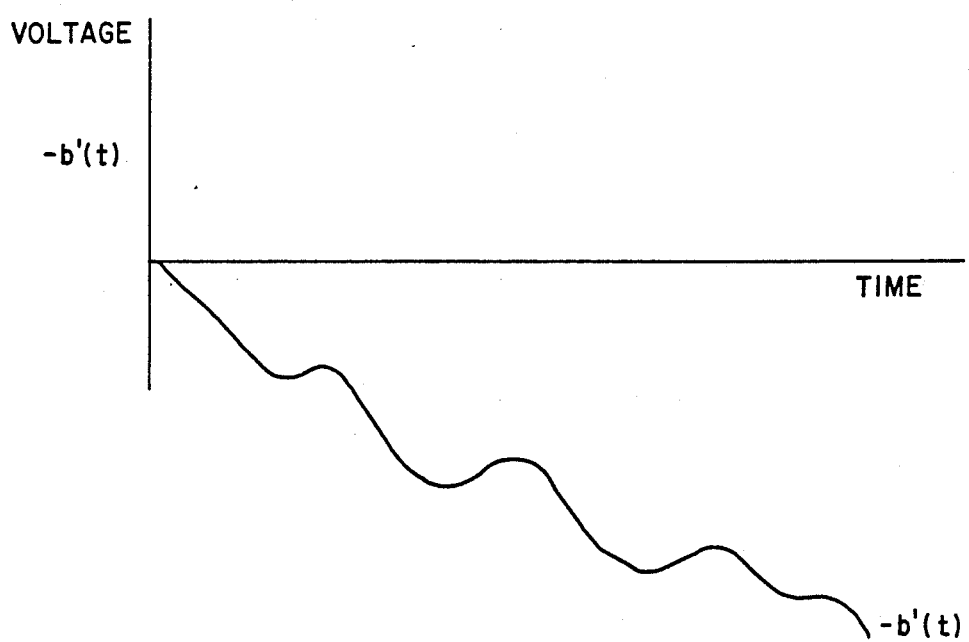
FIG. 6B is a graphical representation of the relationship between signal voltage and time for the inverted feedback value −b(t) of FIG. 6A.
Figure 6C:
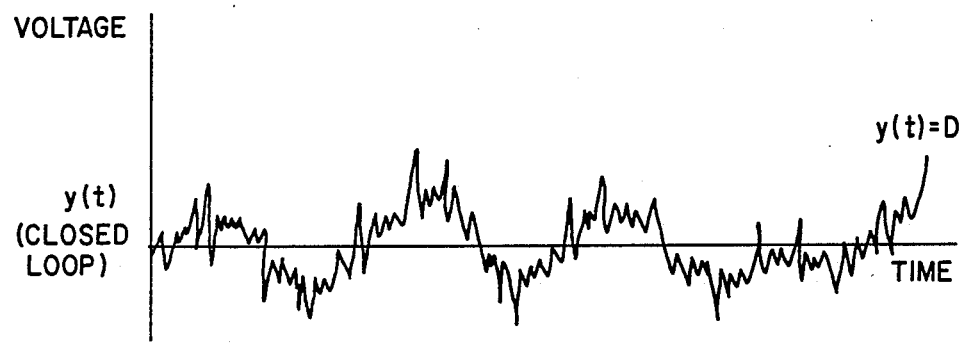
FIG. 6C is a graphical representation of the relationship between signal voltage and time for the closed loop signal y(t) which shows the resulting signal as stabilized within an operating voltage range $V_{min}$ to $V_{max}$ by the feedback of the digital stabilized signal to the analog integrator.

The functional performance of the hybrid analog-digital controller 12 and, more particularly, the digital stabilizer 38 and digital filter 40 as described above can be illustrated with reference to the time history plots of FIGS. 6 and 7. As seen in FIG. 6A, the signal $y'(t)$, also shown in FIG. 5 as signal C, will drift over time due to the addition of low frequency components as previously described. Signal $y'(t)$ represents the signal $y(t)$ from analog integrator 36 with the stabilizer feedback path open, for purposes of illustration hereunder. $b(t)$ is the signal produced by the integration of the digital stabilizer 38 and represents a signal which generally follows $y'(t)$. The digital computations as previously described have filtered out the short-term signal variations to produce a smooth offset signal. The offset signal $b(t)$ is inverted or subtracted as shown by the representation $-b'(t)$, for purposes of illustration, in FIG. 6B. Signal $-b'(t)$ is fed back by summing junction 42 to analog integrator 36. The resulting signal output $y(t)$ as depicted in FIG. 6C is constrained to be within the operating parameters of the analog components between $V_{min}$ and $V_{max}$. The signal is thus adjusted to reflect more accurately a signal over time proportional in magnitude to the absolute velocity of mass 14.

Figure 7A:
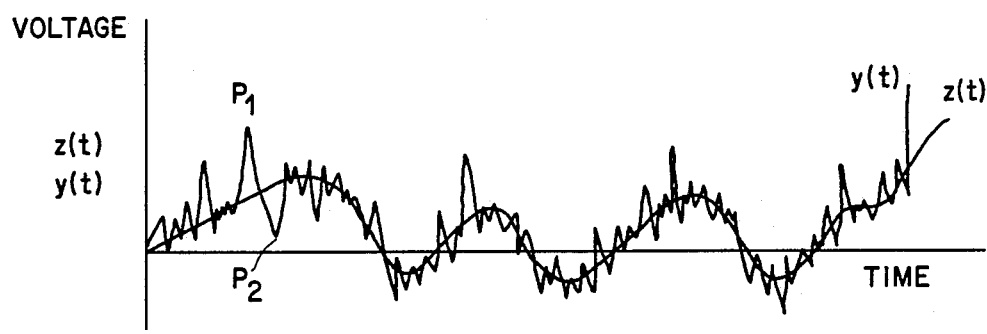
FIG. 7A is a graphical representation of the relationship between signal voltage and time for the signals y(t) and z(t), where y(t) is the closed loop output signal from the digital stabilizing circuit and analog integrator as shown in FIG. 6C, and z(t) is the output signal of the digital filter that produces attenuation of high frequency components of y(t) and represents a filtered, smooth signal generally indicative of y(t)
Figure 7B:
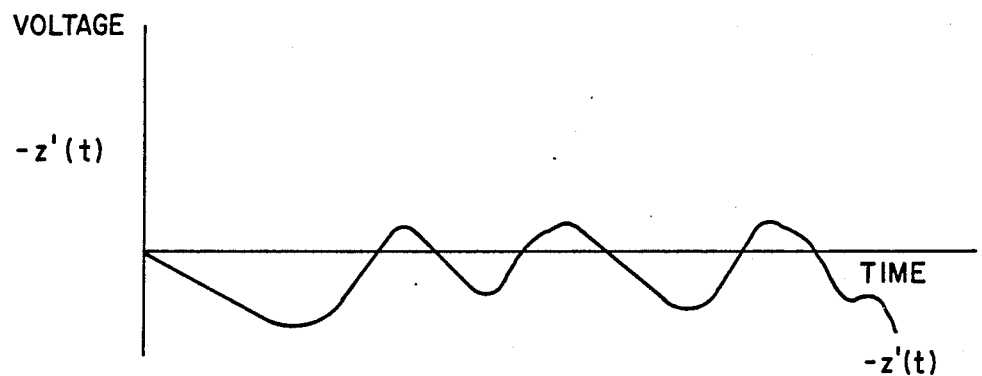
FIG. 7B is a graphical representation of the relationship between signal voltage and time for the inverted signal −z(t) of FIG. 7A.
Figure 7C:
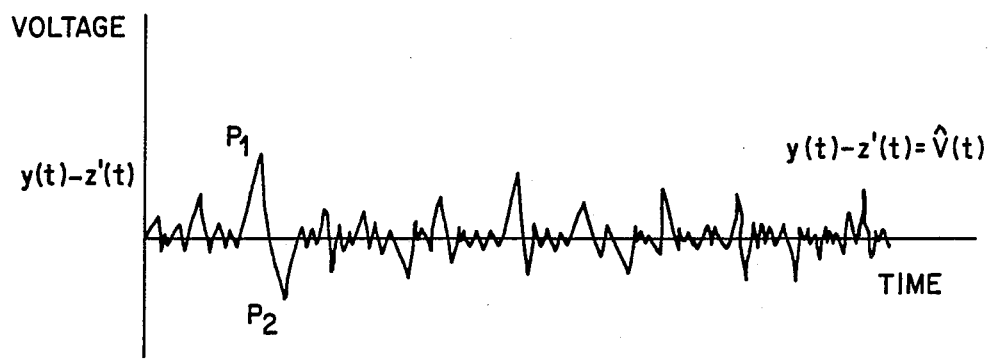
FIG. 7C is a graphical representation of the relationship between signal voltage and time for the signal y(t)−z(t) which shows the resultant signal $\hat{V}(t)$ stabilized about the zero voltage point by the digital filter and feed forward signal to produce a signal indicative of absolute velocity in which meaningful absolute velocity information exists for representative points $P_1$ and $P_2$.

Since the system is still riding on some very low frequency components, as shown by $y(t)$ in FIGS. 6C and 7A, the digital filter 40 operates, in conjunction with the feed forward of the signal through line 41 (FIG. 1) to the summing junction 50 essentially as a high-pass filter to eliminate the excess low frequency components and establish the high frequency signal mean about a constant voltage value. The digital filter 38 performs the digital filter calculations of expression over a shorter sample duration. Since it is desirous to obtain an output signal proportional in magnitude and sign to the absolute velocity of mass 14, it is clear from an examination of signal $y(t)$ that a signal riding on the low frequency components cannot give this information. For example, an examination of points P1 and P2 in FIG. 7A would erroneously predict positive values for both points P1 and P2 as shown. In order to make the correction, the digital filter 40 produces signal $z(t)$ which represents the low-pass filtered signal indicative of the low frequency history of $y(t)$. Signal $z(t)$ is inverted as shown in FIG. 7B and represented for purposes of illustration as $-z'(t)$. The signal $-z'(t)$ as shown in FIG. 7C is summed with the feed forward signal 41 of FIG. 1 to orient the higher frequency signal mean about the mid-range voltage level. Points P1 and P2 as shown in FIG. 7C now will accurately reflect an output proportional in magnitude and sign to the absolute velocity of mass 14.

The overall arrangement of controller 12 may also include a variety of additional electronic components depending upon the particular design. As previously mentioned, the signals processed by summing junction 42 in the analog domain include the input signal from accelerometer 32 and the feedback signal from digital stabilizer 38. The feedback signal is converted to linear form by digital to analog converter 46, as previously indicated. The feedback signal may also be scaled by gain block $k_f$ represented at 52 in FIG. 3, depending upon the desired rate of contribution. From the accelerometer 32, the input signal may be processed by a receiver 54 for rejection of common mode signals, elimination of noise and addition of gain thereto. In conjunction with gain block $K_a$ represented at 56 in FIG. 3, the input signal is scaled and summed at summing circuit 42. A potentiometer 58 is also provided to offset the full-scale range of the signal as seen by the system to optimize resolution of the A/D converter. In conjunction with gain block $K_{os}$ represented at 60 in FIG. 3, the voltage range is adjusted by summation to summing circuit 42. Once the signal estimate of absolute velocity emerges from the hybrid analog digital controller 12, the control algorithm responding to the signal in conjunction with other motion condition criteria such as that derived from relative velocity sensor 34, adjust the damping state of dampers 18. A valve driver 62 is equipped to receive the signal from control algorithm 20 to implement the valve state instructions.

From the foregoing, it is apparent that the hybrid analog digital controller 12 represents an effective yet efficient method of producing a signal idicative of the magnitude and sign of the absolute velocity of a mass to be isolated. The advantages associated with analog signal filtering are realized without the inherent shortcomings normally associated therewith by performance digitally of certain aspects of the filtering process.

While preferred embodiments of the present invention have been described in detail, they are used in a generic and descriptive sense only and not for purposes of limitation; various modifications, alterations and changes may be made without departing from the spirit and scope of the present invention as defined in the appended claims.

What is claimed is:

1. A method for producing a signal indicative of the absolute velocity of a mass from an accelerometer input signal, including the steps of:
    providing an analog integrator means for receiving said input signal and producing a time integrated signal;
    providing a digital feedback means for receiving through an analog to digital converter said time integrated signal to produce a signal which, after passing through a digital to analog converter is fed back to said integrator means to constrain the constant and relatively low frequency components of said integrated signal about an oscillatory voltage range to produce a stable signal; and providing a digital filter means for receiving through said analog to digital converter said stable signal and removing selected constant and low frequency components thereof to produce said signal indicative of the absolute velocity further stabilized about a selected voltage value.

2. A method for producing a signal indicative of the absolute velocity of a mass including the steps of:
providing an input signal idicative of the motion condition of said mass;
integrating said input signal over time using an analog integrator means to produce a time integrated signal;
stabilizing said time integrated signal by feedback of a digital offset signal produced from said time integrated signal to said analog integrator means to produce a stabilized signal within a selected oscillatory voltage range;
removing relatively low frequency components of said stabilized signal by a digital filter means to locate the short term mean of the relatively high frequency components of said stabilized signal about a selected voltage and to produce a signal indicative of the absolute velocity of said mass;
providing an analog to digital signal conversion means for conditioning output signals from said analog integrator means; and,
providing a digital to analog signal conversion means for conditioning input signals fed back to said analog integrator means.

3. An analog and digital controller for producing an output signal indicative of the absolute velocity of a mass comprising:
input signal element for providing an input signal;
analog integrator means receiving said input signal and producing a time-integrated signal;
digital stabilizer means for receiving said time-integrated signal from an analog to digital converter and producing a feedback signal through a digital to analog converter to said analog integrator means to offset the constant and relatively low frequency components of said integrated signal and provide a stabilized, integrated signal; and
digital filter means for receiving said stabilized, integrated signal through said analog to digital converter and locating the short-term frequency mean of said stabilized, integrated signal about a selected voltage and to produce a signal indicative of the absolute velocity of said mass.

4. The analog and digital controller according to claim 3 wherein:
said selected voltage value is a mid-range voltage value indicative of absolute velocity.

5. The analog and digital controller according to claim 3 wherein:
said digital filter means includes a first averager for generating said feedback signal based on a continuous sum of sampled integrated signal values computed over a continuous signal sampling duration.

6. The analog and digital controller according to claim 3 wherein:
said digital filter means is a digital high-pass filter for eliminating the constant and relatively low frequency components of said stabilized, integrated signal.

7. The analog and digital controller according to claim 3 wherein:
the outputs of said analog integrator and said digital filter are connected to a summing junction; and said digital filter means is a digital low-pass filter.

8. An analog/digital controller for producing an output signal indicative of the absolute velocity of a mass comprising:
input signal means for providing an input signal indicative of a motion condition of said mass;
analog integrator means receiving said input signal and producing a time-integrated signal;
digital stabilizer means providing a feedback signal through a digital to analog converter to said analog integrator means to constrain the constant and relatively low frequency components of said integrated signal and provide a stabilized, integrated signal; and
digital filter means receiving through an analog to digital converter said stabilized, integrated signal and eliminating constant low frequency components thereof to produce said output signal proportional in magnitude and sign to the absolute velocity of said mass.

9. The analog digital controller according to claim 8 wherein:
said input signal is a voltage proportional to the acceleration of said mass.

10. The analog digital controller according to claim 8 wherein:
said relatively low frequency components of said integrated signal are less than 0.1 hertz.

11. The analog digital controller according to claim 8 wherein:
said digital stabilizer means includes a first averager generating said feedback signal based on a continuous sum $f(n)$ of sampled integrated signal values computed over a continuous signal sampling duration.

12. The analog digital controller according to claim 11 wherein:
said continuous sum $f(n)$ is computed over said continuous signal sampling duration by addition of a previous continuous sum value $f(n-1)$ to the next time-integrated signal value $r_n$ of said sampled integrated signal values.

13. The analog digital controller according to claim 11 wherein:
said feedback signal is proportional to the quotient produced by $N_1$ shifting operations of said continuous sum $f(n)$.

14. A signal processing method for estimating the absolute velocity of a mass within a frequency range of interest in an active or semi-active suspension system having variable force dampers and of the type responsive to a control algorithm requiring information indicative of the absolut velocity of the mass to be isolated, including the steps of:
providing an analog integrator means for producing a time integrated signal; and,
providing a digital offset means for receiving through an analog to digital converter said time integrated signal, computing an offset average signal over a selected number of signal output cycles, and summing said offset average signal value to an input of said analog integrator means through a digital to analog converter to constrain the constant and low frequency components of said time-integrated signal and to produce a stable integrated signal limited to a selected oscillatory voltage range which is indicative of said absolute velocity in said frequency range of interest.

* * * * *

UNITED STATES PATENT AND TRADEMARK OFFICE
CERTIFICATE OF CORRECTION

PATENT NO. : 4,953,089

DATED : August 28, 1990

INVENTOR(S) : Paul T. Wolfe

It is certified that error appears in the above-identified patent and that said Letters Patent is hereby corrected as shown below:

After the Abstract, change "14 Claims, 5 Drawing Sheets" to -- 14 Claims, 7 Drawing Sheets --.

Column 3, line 44, after "and", insert -- a --.

Column 3, line 61, change "signal" to -- signals --.

Column 7, line 56, delete "analog", second occurrence.

Column 11, line 17, change "examples" to -- example --.

Column 11, line 23, change "complet" to -- complex --

Column 11, line 24, change "overally" to -- overall --.

Column 11, line 27, change "the" to -- The --.

Column 11, line 39, change "2" to -- 0 --.

Column 11, line 67, change "therefore" to -- Therefore --.

Column 12, line 46, change "received" to -- receives --.

Column 13, line 21, change "realtively" to -- relatively --.

Column 13, line 53, after "50", add a comma (,).

Column 14, line 41, change "idicative" to -- indicative --.

UNITED STATES PATENT AND TRADEMARK OFFICE
CERTIFICATE OF CORRECTION

PATENT NO. : 4,953,089

DATED : August 28, 1990

INVENTOR(S) : Paul T. Wolfe

It is certified that error appears in the above-identified patent and that said Letters Patent is hereby corrected as shown below:

Column 15, line 21, change "short term" to -- short-term --.

Column 15, line 38, change "producing" to -- providing --.

Column 16, line 17, after "constant", add -- and --.

Column 16, line 52, change "absolut" to -- absolute --.

Signed and Sealed this

Eighteenth Day of August, 1992

Attest:

DOUGLAS B. COMER

*Attesting Officer*    *Acting Commissioner of Patents and Trademarks*